United States Patent [19]

Harris et al.

[11] 3,817,593

[45] June 18, 1974

[54] IMAGE SURFACE SCANNING SYSTEM

[75] Inventors: Clyde W. Harris; Robert S. Neiswander; Paul S. Sungino, all of Santa Barbara, Calif.

[73] Assignee: The Te Company, Santa Barbara, Calif.

[22] Filed: Nov. 11, 1971

[21] Appl. No.: 197,857

[52] U.S. Cl. ....................... 350/6, 350/294, 350/299

[51] Int. Cl. .......................................... G02b 17/00

[58] Field of Search .................. 350/6, 7, 285, 286, 350/287, 294, 299; 178/7.6

[56] References Cited

UNITED STATES PATENTS

| | | | |
|---|---|---|---|
| 2,146,937 | 2/1939 | Cawley | 350/7 |
| 2,971,695 | 2/1961 | Sick | 350/285 |
| 3,460,892 | 8/1969 | Dolin | 350/7 |
| 3,488,102 | 1/1970 | Buck et al. | 350/7 |
| 3,604,932 | 9/1971 | Beach | 350/7 |
| 3,647,956 | 3/1972 | Buck | 350/7 |

*Primary Examiner*—David Schonberg
*Assistant Examiner*—Michael J. Tokar
*Attorney*—Charlton M. Lewis

[57] ABSTRACT

An optical scanning system especially suited for strip mapping utilizes image surface scanning of an arcuate primary image by means of a continuously rotating circular array of roof reflector pairs, with the edge of the dihedral angle of each roof pair spaced from the axis of rotation by one-half the radius of curvature of the primary image. The primary image surface may be either convex or concave toward the incident radiation. A preferred all mirror system employs as primary objective a spherically concave mirror with reflecting Schmidt corrector plate used in a tilted off-axis configuration which permits unobscured use of a semicircular area of the primary mirror. A reflective relay objective comprising a slightly tilted toric surface receives radiation from the scanning roofs and refocusses the image with further corrections at a field stop to energize the sensor or field of sensors. During transition between adjacent scanning roofs unwanted radiation is cut out by intermittent insertion of an optical switch at the primary image surface. Convenient means are described for generating multilevel calibration signals.

20 Claims, 12 Drawing Figures

INVENTORS.
CLYDE W. HARRIS,
ROBERT S. NEISWANDER,
PAUL S. SUGINO,
BY Charlton M. Lewis INVENTORS.
CLYDE W. HARRIS,
ROBERT S. NEISWANDER,
PAUL S. SUGINO,
By [signature]

INVENTORS.
CLYDE W. HARRIS,
ROBERT S. NEISWANDER,
PAUL S. SUGINO,
BY Charlton M. Lewis

IMAGE SURFACE SCANNING SYSTEM

FIELD OF THE INVENTION

This invention relates generally to optical scanning systems for causing an image of a radiant scene to sweep over a sensor or sensor field, thereby effectively dissecting the scene into a set of sequentially detected elements.

The invention is concerned especially with mechanism for repeatedly scanning a scene in one dimension, which is often referred to as strip mapping. If scanning movement in a second dimension or coordinate is required, it may be accomplished in any desired manner, as by incorporating in the system orthogonal scanning mechansim of any suitable known type, or by bodily translational or rotational movement of the entire system.

The strip mapping system of the invention is especially well suited for laterally scanning landscapes observed from moving vehicles such as aircraft or satellites, the travel of the vehicle then tpyically providing longitudinal scanning movement. However, the invention is useful in its broader aspects for scanning a wide variety of scenes, including objects under study in the laboratory, previously recorded television or motion picture images, and spectral distributions that are to be scanned with respect to wavelength, for example.

The present invention is concerned more particularly with optical scanning systems in which a primary image of a scene is formed by stationary optics, and the scanning action is carried out essentially at that image. Such scanning may be performed by movement of optical elements associated with a relay objective system which refocusses the stationary primary image as a moving image at the sensor. Image surface scanning systems of that general type have the advantage that the moving elements may be simpler and more compact than when they are incorporated in the primary objective system.

RELATION OF THE INVENTION TO THE PRIOR ART

Such image surface scanning of an arcuate primary image may be produced by continuous rotary movement of a circular array of optical relay systems which sweep successively over the arcuate primary image. An illustrative example of such systems is described and claimed in U.S. Pat. No. 3,508,068, issued Apr. 21, 1970 to two of the present applicants. That general type of scanning configuration has many advantages, including the fact that all the moving optical elements are mounted in mutually fixed relation on a single wheel member which rotates at uniform speed. However, especially if the spectral requirements of the system demand that all optical elements be reflective, the relay optics tend to become more complex as the resolution requirements increase. The use of high order aspheric mirrors, such as would be feasible in a single relay system, introduces fabrication difficulties when multiple sets of relay optics must be precisely matched. Also, since the rotating array of relay optics must be concentric with the curved primary image, the overall radius of the rotating system is typically of the same order as the radius of curvature of that image.

The present invention incorporates the primary advantages of the configuration just described, and has the further outstanding advantage of reducing the size of the rotating system by a factor of about two, thereby correspondingly reducing the mass, moment of inertia and space requirements of that system. Moreover, the duplicate sets of scanning optics of the present rotating array typically consist only of plane reflective elements, greatly simplifying accurate duplication of those sets. Only a single relay focussing system is required. That relay objective and the entire sensing system are typically mounted in fixed relation to the primary objective system.

Those advantages of the present invention, together with further advantages to be described, are attained by scanning the arcuate primary image by a continuously rotating circular array of reflective roof pairs, or roof mirrors. Each roof pair comprises two plane reflectors positioned accurately perpendicular to each other, and so arranged that each ray of incident radiation is reflected successively by the two reflectors. The roof pairs are typically mounted at uniform angular intervals about the periphery of a wheel structure, with the edge of each dihedral angle generally parallel to the axis of rotation of the array and with the reflective surfaces facing radially toward the incident radiation.

It is well known that a light beam incident in a plane perpendicular to the edge of a roof pair and reflected successively by the two mirrors is returned parallel to itself and displaced laterally by twice the distance from the edge to the incident beam axis. Hence if the roof pair is translated perpendicular to its edge and to the axis of an image forming beam, the image is translated laterally by twice the roof movement. That doubling of the displacement has been exploited by using a rotating array of roof pairs for scanning an essentially plane optical image, as described, for example, by S. A. Dolin in U.S. Pat. No. 3,460,892 and by W. E. Buck et al. in U.S. Pat. No. 3,488,102. Buck states that the virtual image formed by reflection in the roof mirrors moves "along a locus of travel corresponding to the locus of travel of the reflectors," whether that travel is rectilinear or curved (col. 3, lines 12 to 25), but he does nothing to correct the loss of focus resulting from the circular roof movement. Dolin frankly concedes that rectilinear roof movement would be preferable, but considers the approximation sufficiently good if the wheel is relatively large (paragraph bridging cols. 4 and 5).

SUMMARY OF THE INVENTION

The present invention makes possible the utilization of a rotating array of roof mirrors for scanning an image in an optical system in which accurate focus must be maintained. Such precise preservation of the focus throughout the scan has been made possible by the discovery that the locus of the virtual image formed in such a rotating roof mirror does not correspond to the mirror movement, as stated by Buck et al, but moves along an arc having a radius of curvature equal to twice the radius of the circle described by the roof edge. Accordingly, a rotating array of roof pairs can translate a spherical image laterally for scanning injection to a fixed-axis relay objective without any degradation of focus, provided the circle containing the roof edges has a diameter equal to the radius of curvature of the image. The circle of edges is preferably approximately tangent to the image surface at the optical axis of the beam.

If the image surface is convex toward the incident light, as is typically true of reflective or catadioptric primary objectives, the roof pairs are mounted on the rotating wheel structure with their reflective faces directed outward toward the incident light. If the image surface is concave toward the incident light, as is typically true of refractive objectives that have curved image surfaces, the roof pairs are mounted with their reflective faces directed radially inward. Typical arrangements for preventing interference between the scanning wheel and the optical elements are described below in connection with specific illustrative embodiments of the invention.

In preferred form of the invention, the primary optical system is basically a reflecting Schmidt objective. The spherical primary mirror is elongated in the direction of scan, and is cut away on one side of its major axis to permit insertion of the scanning wheel close to the axis. The reflecting corrector plate is used in a tilted configuration which permits the object plane to be scanned in an unobstructed manner by the remaining half of the spherical primary. With the aperture stop and corrector element at the center of curvature of the primary mirror the primary optical system is essentially operating in an on-axis mode, with the primary image falling on a radius equal to the equivalent focus. The tilted position of the reflective corrector plate inserts into the imagery a slight astigmatism.

The relay optical system typically comprises a single concave mirror used at one to one conjugates and slightly tilted to provide clearance from the scanning wheel for a physical field stop at the relay image. The minimization of the aberrations is accomplished by choice of a mirror radius appropriate to the field requirements, and by incorporation of a toric surface. Optimum toric is selected to minimize the self-induced astigmatism due to tilt of the relay mirror and to partially neutralize the higher order aberrational effects of the corrector element at maximum scan angles.

A further aspect of the present invention prevents spurious radiation from reaching the sensor during transition of the scanning function between adjacent scanning roof pairs, While avoiding occultation of the beam during other portions of the scan. That is accomplished by providing for each roof pair an opaque blade which limits the light beam passing between the two reflectors of the pair during the initial and final phases of its scanning action. The blade is retracted automatically during the intermediate scanning action between those phases. When in operating position, the blade is essentially in the plane of symmetry of the roof pair and extends radially outward from a defining edge which is suitably spaced from the roof edge. The blade is retracted automatically during the central phase of the scanning action of each roof pair.

A further aspect of the invention incorporates means for inserting multilevel calibration signals one or more times during each rotation of the scanning wheel. That is accomplished by inserting wherever required between two of the regular roof pairs a special calibrating roof pair which has its roof edge sharply inclined relative to the axis of rotation, so that it delivers to the relay optics radiation from a synthetic scene placed closely adjacent and at one side of the wheel periphery. That scene typically contains a picket fence pattern of areas maintained at different temperature levels or having different chromatic contents to provide whatever calibrating signals may be required for the particular system. The calibration roof pair produces scanning action over the successive bars of the synthetic scene in essentially the same manner that the regular roof pairs scan the primary image.

A full understanding of the invention, and of its further objects and advantages, will be had from the following description of certain illustrative manners of carrying it out. The particulars of that description, and of the accompanying drawings which form a part of it, are intended only as description and not as a limitation upon the scope of the invention, which is defined in the appended claims.

DESCRIPTION OF ILLUSTRATIVE EMBODIMENTS

The present invention utilizes a known property of a roof reflector or roof pair, by which a plane optical image can be scanned optically by translational movement of such a roof pair parallel to the plane of the image. The principle of such scanning action is illustrated schematically in FIGS. 1 and 2.

Figure 1:
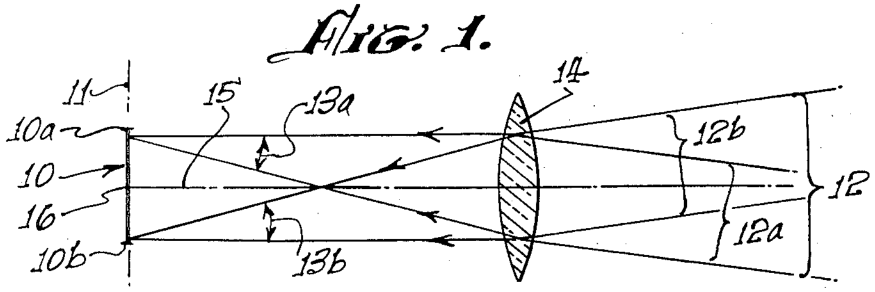
FIG. 1 is a schematic drawing representing an optical system for imaging a scene.

FIG. 1 represents at 14 a conventional objective which forms a plane image 10 of an extended linear object, which is assumed for clarity to be at a considerable distance to the right of the drawing on the optical axis 15. The illustrative points **10*a* and 10*b* of image 10 are formed by the incident beams 12*a* and 12*b* of essentially parallel light, which form the light cones 13*a* and 13*b* after refraction by objective 14. The complete incident radiation beam 12 is made up of such cone forming beams for all points of the image. The present type of scanning action is accomplished by translating the incident cone for each image point in succession to a selected relay point 16, which typically coincides with the axial point of image 10**.

Figure 2:
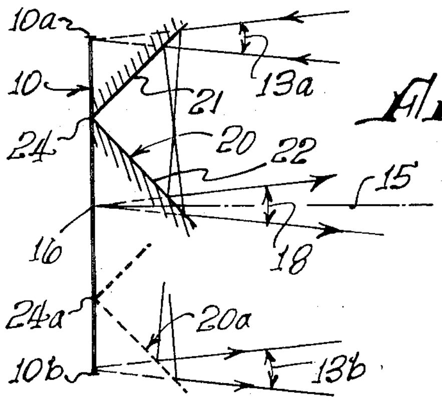
FIG. 2 is a schematic drawing illustrating conventional scanning of a plane optical image of a scene by movement of a roof pair.

FIG. 2 corresponds to the left-hand portion of FIG. 1 at enlarged scale, and further shows a roof pair 20 in position to translate image point 10*a* to the relay point 16 on axis 15. Incident light cone 13*a* is reflected successively at the two mutually perpendicular reflecting roof faces 21 and 22, which form an internal right dihedral angle with roof edge at 24. The resulting translated beam is indicated at 18, diverging from the virtual image point at 16 and directed back along axis 15 generally toward objective 14. That action results when the roof edge 24 of roof pair 20 is at a point of image 10 half way between 10*a* and axis 15. By movement of the roof inward along the image from the position of FIG. 2, successive points of image 10 are similarly translated to relay point 16, so that the light emerging at 18 from the fixed relay point 16 corresponds to longitudinal scanning of the image. That scanning action is completed when the roof pair reaches the position 20*a*, shown in phantom lines in FIG. 2, at which image point 106 is translated to relay point 16. The overall movement of the roof pair thus equals half the total length of the scanned image.

Similar scanning action can be obtained by moving roof pair 20 parallel to the image surface, but with roof edge 24 displaced axially by a constant amount from the image plane. Relay point 16 is then also displaced axially from the image plane by twice the displacement of the roof edge.

Repeated scanning of an image in accordance with FIGS. 1 and 2 can be produced by rectilinear oscillation of the roof pair parallel to the image plane. However, such motion is difficult to drive with uniform velocity, and the driving mechanism tends to produce vibration. Those and other disadvantages can be overcome by mounting a series of roof pairs on the periphery of a continuously rotating scanning wheel, so that as one roof pair leaves the image at one end another enters at the other end. However, that arrangement introduces a shift of focus of the output beam 18, since the circular path of the roof pairs introduces a component of movement of each roof edge transverse to image 10. In the prior art such shift of focus has been accepted as a necessary evil, and has simply been minimized by employing a wheel of relatively large diameter.

In accordance with the present invention, a circular array of roof pairs is made to scan an image without any approximation as to focus by employing a primary optical system having an image surface that is circularly curved in the direction of scan, and by properly matching the curvature of the image surface to the radius of the circular array of roof pairs. It has been discovered that if the radius of curvature of the image surface is just twice that of the path of each roof edge precise focus can be maintained, the maximum size of the scanned image being limited only by geometrical considerations.

Whereas it is usually preferable to satisfy that condition for accurate focus as closely as possible, the invention is also useful under a wide variety of conditions where the preferred condition is met only approximately. For example, the primary objective may produce an image that departs appreciably from circular curvature, especially at large field angles. Or special considerations, such as clearance requirements between components, may require that the scanning wheel radius depart appreciably from half the radius of curvature of the image surface. However, the defined relation provides a basic standard, from which any departure produces a definite degradation of a focus.

The invention is useful in connection with a wide variety of primary objective systems which have a circularly curved image surface, or for which the image surface is curved approximately circularly. A particularly desirable type of primary objective comprises a spherically concave mirror with aperture stop essentially at the center of curvature and with one or more optical elements for correcting spherical aberration.

Figure 3:
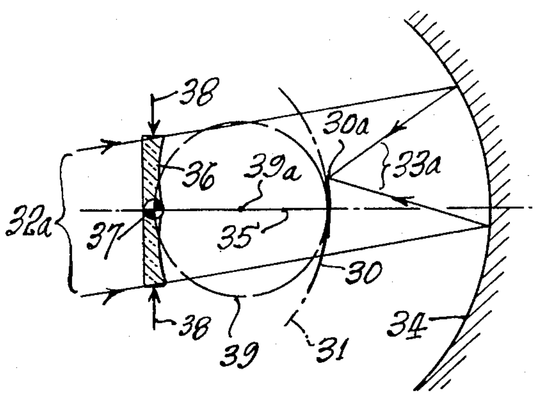
FIG. 3 is a schematic drawing representing an optical system for producing a convex spherical image of a scene suitable for scanning in accordance with the invention.

FIG. 3 shows schematically a catadioptric system of that type, comprising the concave mirror 34 with its center of curvature at 37, and the refractive Schmidt corrector plate 36 on the axis 35. The aperture stop 38 is at the corrector plate. Such a system has a spherically curved image surface 31 concentric with mirror 34 at a radius of curvature essentially half that of the mirror. The circularly curved image, elongated in the plane of the drawing, is indicated at 30. The illustrative image point 30*a* is formed by the incident light beam 32*a*, which becomes the light cone 33a after reflection at mirror 34.

In accordance with the present invention, the circularly curved image 30 of FIG. 3 may be scanned without loss of focus by means of a continuously rotating circular array of roof pairs mounted on a wheel structure with their roof edges generally parallel to the wheel axis and at a radius from that axis equal to half the radius of curvature of image surface 31. The wheel is journaled on the axis 39*a* which is so positioned that the circular path of the roof edges, indicated at 39, is approximately tangent to image surface 31, typically at optical axis 35.

Figure 4:
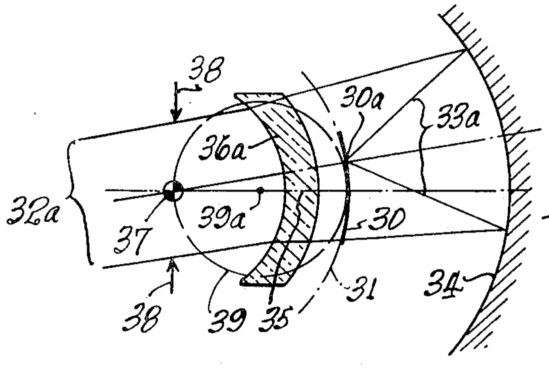
FIG. 4 is a schematic drawing similar to FIG. 3 and representing a modification.

FIG. 4 shows schematically an objective generally similar to that of FIG. 3, but employing a concentric meniscus element 36a for correcting the spherical aberation of mirror 34. Alternatively, that correction may be divided between a concentric element such as 36*a* and a Schmidt plate such as 36 in FIG. 3. A typical circular path for the scanning roof pairs is indicated at 39 with axis at 39*a*, as in FIG. 3. A system utilizing a reflective correcting plate is described below, and has the advantage that all elements are then reflective.

Figure 5:
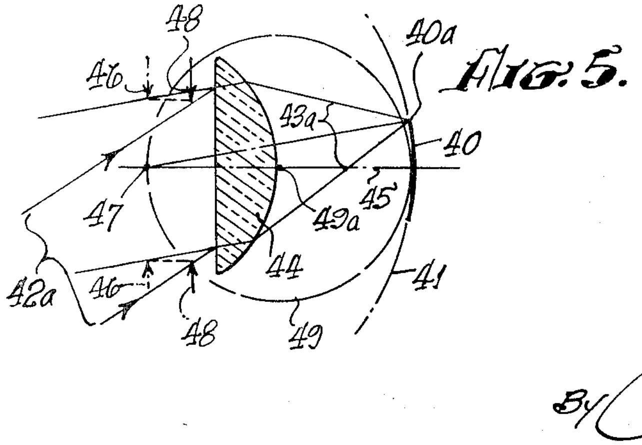
FIG. 5 is a schematic drawing representing a refractive optical system for producing a concave spherical image of a scene suitable for scanning in accordance with the invention.

FIG. 5 shows schematically an illustrative refractive objective comprising the single plano-convex lens 44 with the optical axis 45. The sperically curved image surface 41 has its center of curvature at 47 concentric with the convex lens face. The physical aperture stop is indicated at 48 and is so placed that its virtual image formed by the plane face of lens 44 provides an effective stop 46 at center 47. The typical incident beam 42a is first refracted at the plane face of lens 44 and then focussed to the cone 43a which converges toward the image point 40*a*.

Alternatively, the lens 44 of FIG. 5 may have the form of a half sphere or a full sphere with the stop at the center plane. The arrangement of FIG. 5 has the advantage of greater compactness, especially when the index of refraction is high, since the physical stop 48 is brought closer to the first surface of the lens.

In contrast to the systems of FIGS. 3 and 4, in which the optical power is provided by a reflective element, refractive objectives tend to produce image surfaces that are concave toward the incident light, as typified by the image surface 41 and incident light cone 43*a* of FIG. 5. The scanning wheel of the present invention is then mounted on the side of the image toward the objective, as indicated schematically by the circle 49 in FIG. 5 with center at 49*a*. Also, the roof pairs are mounted on the wheel periphery with their reflective faces directed inward, in contrast to the outward direction of those faces in the systems of FIGS. 3 and 4. For both convex and concave image surfaces, the roof edges are preferably mounted at a radius from the wheel axis equal to half the radius of curvature of the image surface.

All of the illustrative systems of FIGS. 3 to 5 employ centered optical systems in the sense that the optical elements have a common optical axis. They also have the property that the chief ray for any image point, which is the ray passing through the optical center of the entrance pupil, coincides with a radius of the arcuate image surface. That fact improves the duty cycle of the scanning action obtainable by the present invention, as will become more clear below.

Figure 6:
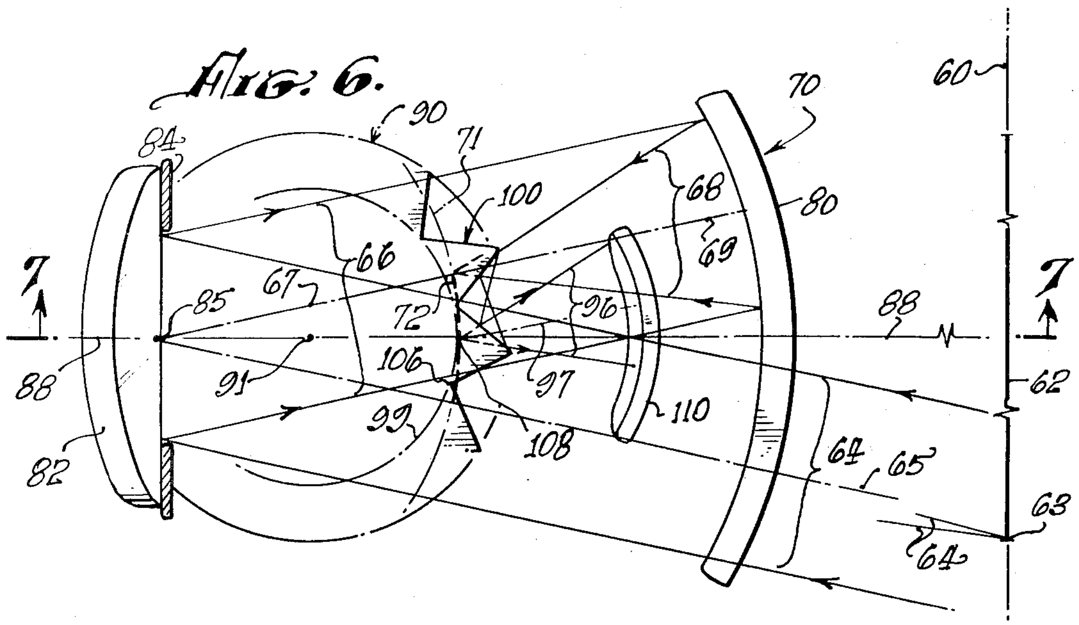
FIG. 6 is a schematic plan representing an illustrative image scanning system in accordance with the invention.
Figure 7:
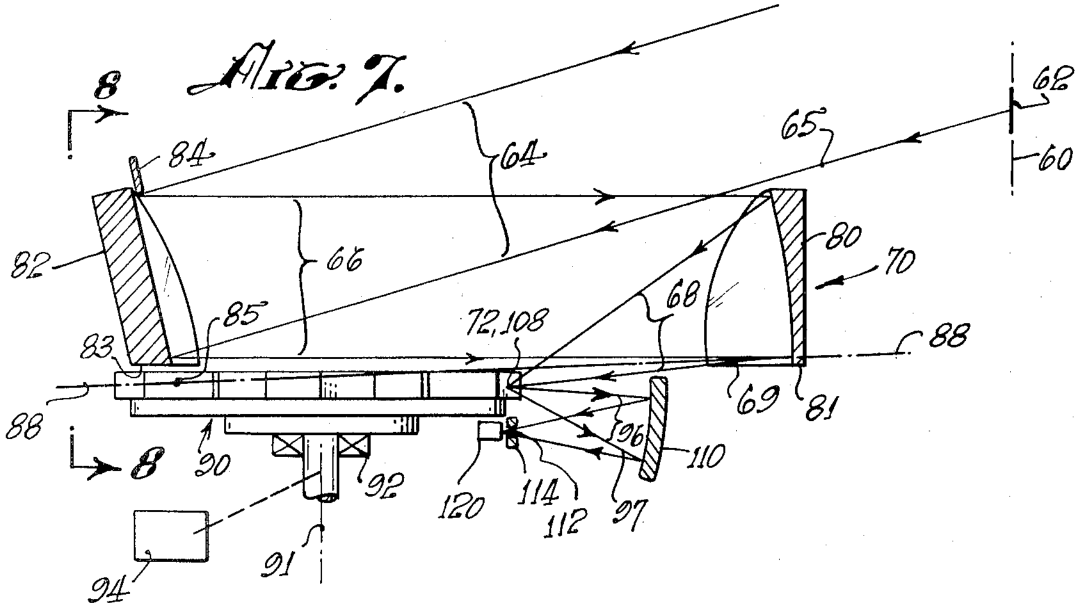
FIG. 7 is a schematic section on the line 7—7 of FIG. 6.
Figure 8:
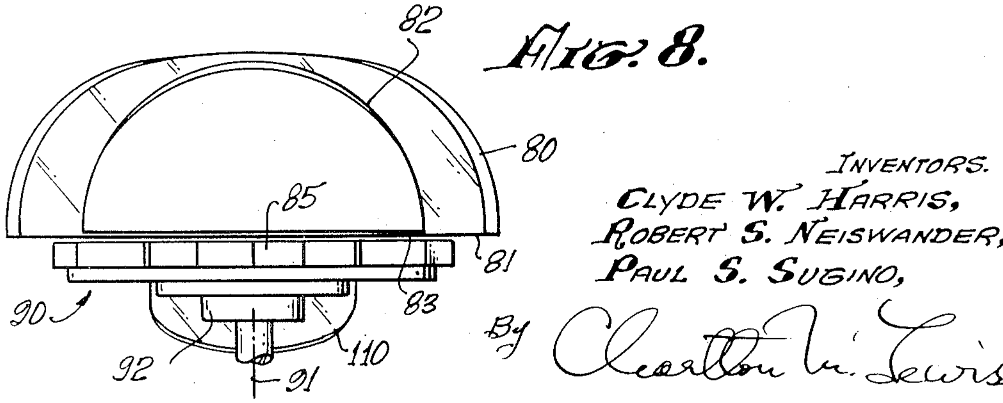
FIG. 8 is a schematic end elevation in the aspect of line 8—8 of FIG. 7.

FIGS. 6 to 8 represent schematically a preferred embodiment of the invention in an optical strip scanning mechanism for scanning a distant scene 60. The strip covered by a single scan is indicated at 62 and is elongated in the direction of scan, which is perpendicular to the paper in FIG. 7. Radiation from scene 60 is focussed by the primary objective 70, which comprises the spherically concave primary mirror 80 with center of curvature at 85, and the reflective Schmidt corrector plate 82 positioned on the optical axis 88 at center 85. Objective 70 forms the primary image 72 of scene strip 62 in the spherical image surface 71 which is concentric with the primary mirror and at half the radius of that mirror from center 85.

The typical incident radiation beam 64 of essentially plane parallel radiation from the point 63 of scene strip 62 is reflected to primary mirror 80 by corrector plate 82, which is figured to correct the spherical aberration introduce by the primary. The corrector is tilted, as shown best in FIG. 7, to separate the reflected beam 66 from incident beam 64, enabling the latter to clear the primary mirror. The convergent beam 68 reflected from primary mirror 80 forms one point of primary image 72. The beam aperture is defined by an aperture stop at center of curvature 85. Corrector plate 82 may act as that stop, or an auxiliary stop may be provided, as represented at 84 in FIGS. 6 and 7 but omitted in FIG. 8 for clarity of illustration. The shape of that stop is discussed below.

Scanning action is performed essentially at the image surface 71 by the rotating scanning wheel 90. That wheel is journaled by suitable bearings 92 on the wheel axis 91 and is driven typically at a uniform rate of rotation by drive means represented schematically at 94. Scanning wheel 90 carries a circular array of roof reflectors 100, arranged at generally uniform angular intervals about its periphery. Each roof reflector, or roof pair, comprises two plane reflective surfaces 102 and 104 positioned exactly perpendicular to each other to form a dihedral angle of 90° at the roof edge 106. The roof pairs are mounted on wheel 90 with their roof edges 106 generally parallel to the wheel axis and the reflective surfaces facing radially outward. Wheel 90 is journaled with its axis 91 generally perpendicular to optical axis 88 and with its periphery tangent to the circular primary image 72, so that wheel rotation moves the roof pairs successively along the length of image 72.

The scanning wheel may be considered to translate the fixed primary image 72 into a moving scan image 107 which shifts periodically parallel to its length, moving at uniform speed during translation by one of the moving roof pairs, and jumping back effectively instantaneously as the adjacent roof pair comes into operating position. Scan image 107 is difficult to illustrate in the present system, since it lies essentially in the same surface as image 72, as will become more clear from later discussion of FIG. 9.

The optical relay system 110 translates the moving scan image 107 to a position 112 at which the physical field stop 114 and the radiation sensor 120 can conveniently be placed. Field stop 114 selects from the moving relay image 112 an elementary area which contains the only radiation that sensor 120 will see at any instant. That selected elementary area, being defined by stop 114, remains fixed relative to the relay system as relay image 112 moves across it. Sensor 120 thus effectively sees only the corresponding fixed elementary area 108 of moving scan image 107. That selected area 108 of the scan image is typically in the midplane of the primary image to be scanned. It will be referred to as the scan point, being typically only a point or a short line segment perpendicular to the direction of scan. The relay system is required to produce good definition only over the very small field defined by the fixed scan point. On the other hand, the aperture requirements on the relay system are relatively severe, since the cone of radiation 96 entering the relay system from scan point 108 swings laterally about that area as a center in response to the varying angles at which incident beam 68 approaches different portions of primary image 72. The angular range for that beam movement in relay system 110 equals the common angular range for beams 64, 66 and 68 in the primary optical system.

A preferred type of relay optical system for meeting those requirements comprises the single generally spherical concave mirror 110, positioned to produce the relay image 112 at approximately one to one magnification. Mirror 110 is elongated horizontally, as seen best in FIG. 8, to accommodate the lateral movement of the entering cone 96. It is tilted slightly to provide clearance between relay image 112 and the scanning wheel for insertion of field stop 114 and sensor 120.

Figures 9, 10, 11, 12:
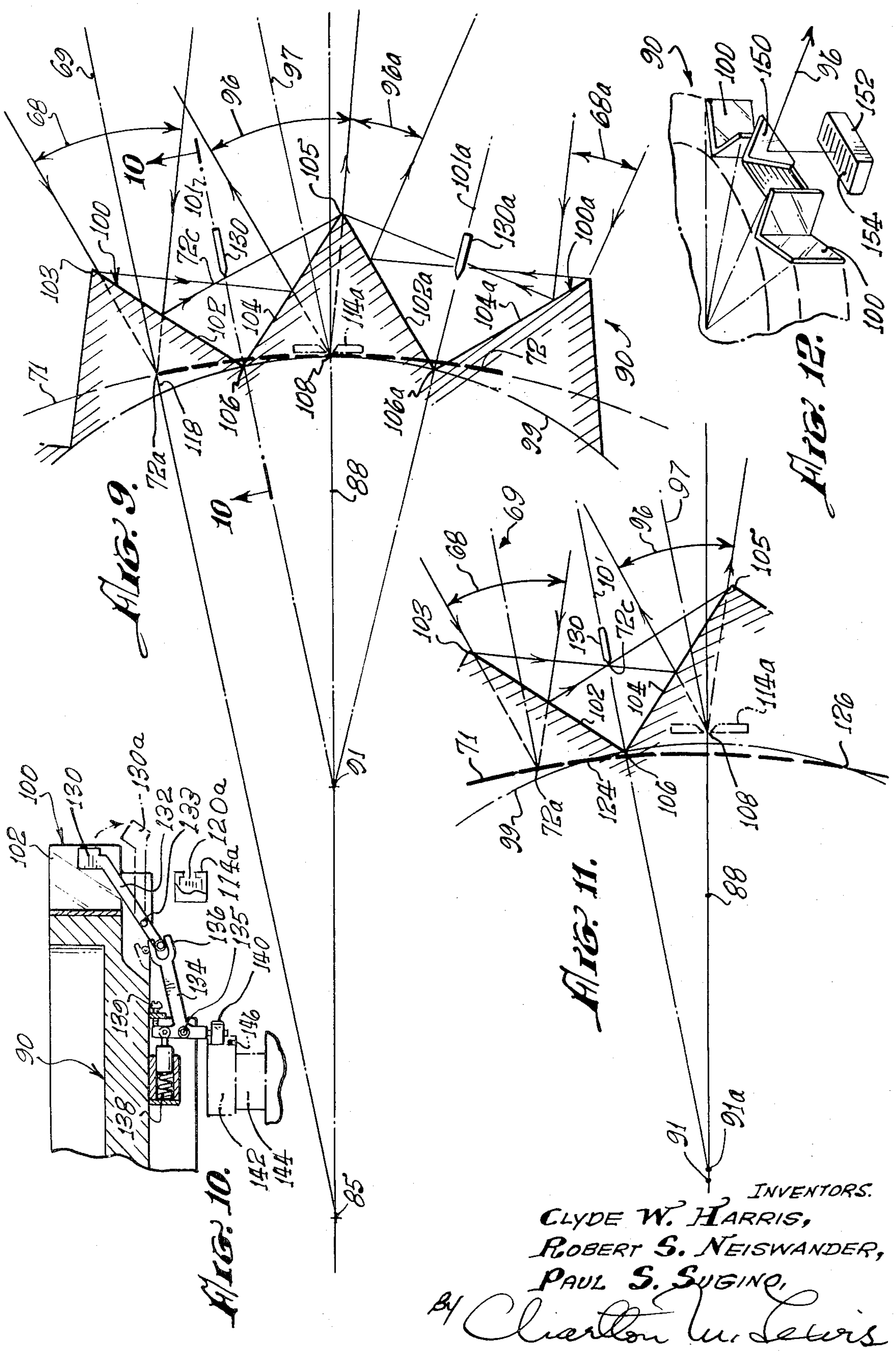
FIG. 9 is a schematic drawing corresponding generally to a portion of FIG. 6 at enlarged scale.
FIG. 10 is a fragmentary section on line 10—10 of FIG. 9.
FIG. 11 is a schematic drawing similar to a portion of FIG. 9 and representing a modification.
FIG. 12 is a perspective of a portion of a scanning wheel, representing a calibrating device.

The sensor may comprise a single radiation responsive element, or a linear array of closely spaced detectors extending transversely of the direction of scan, as indicated schematically at 120*a* in FIG. 10. By separately processing the outputs of such individual detectors, improved resolution is obtainable perpendicular to the optical scan direction. The sensor or sensor array may be positioned immediately behind the field stop, as indicated for a separate stop 114 in FIG. 7, and for a stop 114*a* integrated with the sensor housing in FIG. 10. Alternatively, particularly if radiation is to be sensed simultaneously in a plurality of wavelength regions, a plane mirror or a further relay optical system may be inserted to permit more remote location of the sensor system.

Improved overall definition may be obtained by incorporation in relay mirror 110 of a toric surface. The use of a toric of optimum power can provide the two functions: minimization of the self-induced astigmatism due to the mirror tilt, and partial neutralization of the higher order aberrational effects of the primary corrector element 32 at maximum scan angles.

The present system utilizes a preferred one of the many available configurations for positioning scanning wheel 90 in the desired tangential relation to primary image 72 without severe obscuration of the primary optical system. Primary mirror 80 and corrector plate 82 are cut away below the respective lines 81 and 83, which are essentially horizontal diameters of the elements as seen in FIG. 8, for example. Beams 64, 66 and 68 are then generally semicircular in section, and their chief rays 65, 67 and 69 appear approximately at the lower beam edge as seen in FIG. 7. The primary mirror operates essentially in an on-axis mode, being tilted only enough to place image 72 clear of beam 66. Scene strip 62 is imaged at 72 without central obscuration of the primary beam. Scanning wheel 90 can then be mounted tangent to image 72 and with its plane essentially parallel to optical axis 88, and beam 96 entering the relay system is separated from primary beam 68. Relay mirror 110 is cutaway above its horizontal diameter as seen in FIG. 8, for example, and is accommodated by the described arrangement without causing further obscuration.

FIG. 9 shows schematically the working portion of scanning wheel 90 at enlarged scale for clarity of illustration. The roof pairs 100 and 100a have their roof edges 106 and **106*a* on the circle 99, which is concentric with wheel axis 91 and has a radius half that of primary image surface 71. Point 72*a* of primary image 72, which is formed by incident beam 68, is optically transferred by roof pair 100, first to the intermediate real image 72*c* and then to the virtual image at scan point 108, from which exit beam 96 appears to diverge. Since circle 99 is tangent to primary image surface 71 in FIG. 9, scan point 108 lies in the image surface for all rotary positions of the scanning wheel. The position of point 108 in that surface is defined by the physical field stop 114 in the image space of relay optical system 110 (FIG. 7). That fact is indicated in FIG. 9 by showing in phantom lines the image 114*a*** of that field stop.

The general relation holds for all scan positions, as exemplified in FIG. 9, that chief rays 69 and 97 of both the incident and exit beams are approximately parallel to the plane of symmetry 101 of the roof pair, and are spaced approximately symmetrically with respect to that plane. If scanning wheel 90 is considered to turn clockwise from the position of FIG. 9, beams 68 and 96 shift symmetrically toward plane 101, and real image **72*c* approaches roof edge 106. As roof edge 106 passes scan point 108**, the real and virtual images coincide, all reflection occurring ideally at the roof edge.

On the other hand, as scanning wheel 90 turns counterclockwise from the position of FIG. 9, the corner 105 between roof pairs 100 and **100*a* sweeps counterclockwise across exit beam 96, and incident beam 68 sweeps counterclockwise across roof corner 103 at essentially the same rate, since image point 72*a* moves counterclockwise at twice the angular rate of the roof pair. Hence both entrance and exit beams are occulted essentially simultaneously and within a relatively small angular movement of wheel 90**, leading to a satisfactory duty cycle for the scanning mechanism.

However, as one roof pair leaves working position, the next roof pair of the circular array comes into working position, tending to insert into the relay system progressively increasing radiation from the opposite end of primary image 72. The spurious signal that would result from that action can be eliminated, for example, by disabling the sensor 120 (FIG. 7) under electronic control during the short periods when radiation is received from both ends of the image. It is preferred, in accordance with a further aspect of the present invention, to eliminate such spurious signals by providing an optical switch for each roof pair which permits radiation to pass between the two reflecting faces of the roof only within a predetermined distance of the roof edge. Such optical switches are indicated in FIG. 9 at 130 and **130*a*, in the form of opaque shields positioned in the planes of symmetry of the respective roof pairs and with sharp working edges facing radially inward toward the roof edges 106 and 106*a*. With the shields positioned as shown, the full radiation beam is transmitted between roof faces throughout the working cycle of the scanning mechanism, as shown best for shield 130. As wheel 90 turns counterclockwise from the position of FIG. 9, real image 72*c* moves progressively outward, so that the radiation beam is cut off by shield 130. That switching action is illustrated by roof pair 100*a* in FIG. 9, since incident radiation beam 68*a* would be inserted as exit beam 96*a* into the relay system as if coming from point 108, if it were not wholly eliminated by shield 130*a*. Since image 72*c* is close to the plane of the shield, the switching action is far more rapid than the described occulting action of roof corners 103 and 105**.

The shields 130 as shown in FIG. 9 would partially obscure the incident and exit radiation cones during the intermediate portion of each scan cycle. Such interference is avoided, in accordance with a further aspect of the invention, by shifting each shield out of operating position during that intermediate portion of the scan cycle of its roof pair.

Mechanism for producing such movement is illustrated schematically in FIG. 10, which shows only the peripheral portion of wheel 90. Shield 130 is mounted on the arm 132 which is pivoted at 133 on the wheel body for swinging movement between the working position shown in solid lines and the retracted position **130*a* shown in phantom lines. That arm movement may be driven in any suitable manner, for example by a solenoid energized periodically via a cam actuated switch. A purely mechanical drive in shown illustratively in FIG. 10**.

The motion amplifying lever 134 is pivoted at 135 on the body of wheel 90 and is coupled to arm 132 via the yoke 136, which acts at a short lever arm from pivot 133 and a long lever arm from pivot 135. Lever 134 is biased by the spring 138 toward working position of shield 130, which is adjustably defined by the screw 139 to produce light switching action at the start and end of each scan cycle, as already described. A lower extension of lever 134 carries the cam follower 140. The cam 142 is fixedly mounted by the bracket 144 in the plane of optical axis 88 and radially inward of sensor 120. Scanning wheel rotation causes the cam followers of the respective shield mechanisms to successively engage the cam lobe 146 and retract each shield only during the period at the center of the scan cycle when the incident and exit beams 68 and 96 (FIG. 9) are close enough to plane of symmetry 101 so they might be obscured by the shield.

As may be seen from FIG. 9, the substantial symmetry of the incident and exit beams with respect to plane of symmetry 101 of the roof pair is rendered incomplete by the fact that relay point 108 is on circle 99 whereas image point **72*a*, being in image surface 71, is spaced radially outward a distance 118 from circle 99. Essentially perfect symmetry of the described type is obtainable at the beginning and end portions of each scan by shifting the axis 91 of scanning wheel 90 farther away from optical center 85 by approximately half of the spacing 118, just defined, to 91***a* as shown illustratively in FIG. 11. Circle 99 then intersects image surface 71 at two points 124 and 126, equally spaced on opposite sides of axis 88. Image point 72*a* is thereby shifted closer to circle 99, and its image at 108 is shifted correspondingly in the opposite direction, or radially outward from circle 99. Optimum improvement in beam symmetry is obtained when the image end points 72*a* and scan point 108 are equally offset radially from the circle 99 of the roof edges.

The resulting improvement in beam symmetry produces more nearly simultaneous occultation of the incident and exit beams by roof corners 103 and 105, increasing the duty cycle. It also shifts intermediate real image 72*c* substantially to plane 101, greatly sharpening the switching action obtainable by shields 130. The improvement obtainable by the described adjustment increases rapidly with increasing angular field of scanning.

A further advantage of shifting circle 99 away from strictly tangential relation to image surface 71 is that the normally very slight crack or hiatus between the two reflecting faces of each roof pair at its roof edge then causes only negligible loss of illumination as the roof edge crosses the optical axis at the midpoint of the scan cycle. It may even be desirable for that purpose to make the spacing of point 108 from circle 99 and from image surface 71 greater than is required to obtain beam symmetry at the ends of the scan, accepting a compromise with the described advantages of such symmetry.

It is desirable to provide one or more calibration signals to sensor 120 as a reference level for the electrical output. If the shields 130 of FIGS. 9 to 11 are black, and are also of a known temperature when the sensor is responsive to infrared radiation, the blanking interval between adjacent scans can be used as a single-point radiant calibration level. Additionally, however, multilevel calibration signals are desirable to insure quantitative testing over the entire dynamic range of response.

A further aspect of the invention provides such calibration signals, typically once each revolution of scanning wheel 90, by inclining one of the roof pairs, as shown illustratively at 150 in FIG. 12, so that exit beam 96 receives radiation from the synthetic scene indicated schematically at 152. Scene 152 may be produced in known manner, and typically contains, as a picket fence pattern 154, an assortment of colors chromatically shaped to match the dynamic range of the scene 62 to be scanned (FIG. 6). When infrared radiation is to be detected pattern 154 preferably includes an assortment of temperature levels, some cooler than ambient and some warmer. The inclined roof pair 150 typically projects from the circle of aligned roof pairs sufficiently to place the focal point 108 of the relay optical system optically close to scene 152. Upon rotation of the scanning wheel, roof 150 then causes point 108 to scan scene 152 optically in much the same manner that the other roof pairs cause it to scan primary image 72. If more frequent calibration is required, any desired number of calibration roof pairs may be provided at angular intervals around the wheel.

The described use of a roof pair for calibration tends to produce a gap in the scan pattern, assuming, for example, that scanning perpendicular to the strips 62 is produced by aircraft movement over the ground. Such a gap may be eliminated by progressively tilting the roof edges around the circle by the small angle needed to space successively scanned strips more widely on the ground by the amount needed to fill the gap. The required image adjustment between adjacent roof pairs depends upon the angular separation of adjacent scan strips, the number of scanning roof pairs, and also upon the angular width of the roof pair used for calibration, since the latter need not occupy the same angular interval of the scanning wheel as the scanning roof pairs. The image movement produced by tilting a roof pair equals the product of the tilt angle by the radial separation of the roof edge from the focus. The latter distance may vary over a considerable range, as already indicated in connection with FIG. 11. However, since the present system is especially adapted for very high optical resolution, typically approaching the diffraction limit, the angular spacing between successive scan strips is ordinarily small so that adequate tilt adjustment is readily obtainable.

A particular advantage of the present scanning system is that strip scanning is accomplished with only a single moving optical part, scanning wheel 90, which rotates at uniform speed, all other optical elements and the wheel bearings being typically mounted rigidly on a conventional frame or housing, not explicitly shown. Moreover, the scanning wheel bearings are not required to maintain precise axial definition of the wheel. Since the plane reflective surfaces of the roof pairs are typically parallel to the wheel axis, moderate wheel displacement in that direction has no optical effect.

We claim:

1. An optical system for scanning a radiant scene, comprising primary objective means for forming a primary image of the scene at an image surface, at least one roof pair, comprising two plane reflective surfaces forming an internal right dihedral angle at a roof edge, means for moving the roof pair along the image surface with the roof edge generally perpendicular to the direction of movement and with said reflective surfaces directed to successively reflect image radiation and thereby translate at least a strip of the primary image into a moving scan image, and output means for selecting reflected radiation that corresponds to a fixed elementary area of the moving scan image, said primary image surface being substantially circularly curved, and the path of movement of the roof edge being circularly curved in the same direction as the image surface and with a radius of curvature essentially equal to one half the radius of curvature of the image surface.

2. An optical system according to claim 1, and in which said output means comprise relay optical means for imaging a portion of the scan image including said elementary image area at a fixed field stop which is positioned to pass only radiation corresponding to the elementary image area.

3. An optical system according to claim 2, and in which said roof pair is one of a plurality of roof pairs arranged in a circular array and mounted for bodily rotary movement about the axis of the array, said system including means for continuously driving the array in its rotary movement, whereby the respective roof pairs successively translate the primary image.

4. An optical system according to claim 3, and in which said primary objective means comprise a centered optical system such that the chief ray for each point of the primary image is perpendicular to the primary image surface, and the plane of symmetry of each said roof pair lies in a plane through the array axis, the reflected radiation beam for said selected area of the scan image and the incident radiation beam for the corresponding area of the primary image being substantially parallel to, and symmetrically placed with respect to, the plane of symmetry of each roof pair throughout its said image translation.

5. An optical system according to claim 3, and including also an opaque shield having a working position approximately in the plane of symmetry of each roof pair, with a working edge spaced from the roof edge to intercept translated radiation corresponding to points of the primary image surface beyond the ends of the image to be scanned, and thereby to prevent two adjacent roof pairs from translating primary image radiation simultaneously to said selected area of the scan image.

6. An optical system as defined in claim 5, and including also means for shifting each said shield to an idle position with of primary image radiation during said translation by the corresponding roof pair of an intermediate portion of the primary image.

7. An optical system according to claim 3, and in which the end points of the primary image strip to be scanned and said selected area of the scan image are approximately equally offset radially from said circular path of the roof edges, said system including also an opaque shield for each said roof pair, having a working edge, and means for mounting each shield normally in a working position essentially in the plane of symmetry of the roof pair and with the working edge at such spacing from the roof edge that, when the roof pair is in position to translate a primary image end point to said selected area, the shield intercepts radiation corresponding to points of the primary image surface beyond said end point.

8. An optical system as defined in claim 7, and including also means for shifting each said shield to an idle position clear of primary image radiation during said translation by the corresponding roof pair of an intermediate portion of the primary image.

9. An optical system for scanning a radiant scene, comprising in combination primary objective means for forming an elongated primary image of the scene in a substantially circularly curved image surface having a radius of curvature, a circular array of roof pairs, each comprising two plane reflective surfaces forming an internal right dihedral angle at a roof edge, with the roof edges generally parallel to the axis of the array and at a radius therefrom essentially equal to one half the radius of curvature of the image surface, means for mounting the array for coaxial rotation, with the array axis generally parallel to the image axis and the circle of roof edges generally tangent to the primary image, the roof pairs being directed to reflect primary image radiation successively from said two surfaces and to translate at least a strip of the primary image progressively point by point to a fixed scan position, relay optical means for imaging the scan position at a fixed field stop, and means responsive to radiation passing the field stop.

10. An optical system according to claim 9, and in which the effective apertures of the primary objective means and of the relay optical means are approximately semicircular; and the array of roof pairs is mounted generally parallel to diametral planes of said means.

11. An optical system according to claim 9, and in which said primary objective means comprise a spherically concave mirror with a reflective Schmidt corrector plate and aperture stop at the center of curvature of the mirror, and said relay optical means comprise a generally spherically concave mirror having its center of curvature adjacent said scan position to image the same at substantially one to one magnification.

12. An optical system according to claim 11, and in which the relay mirror has also a toric curvature.

13. An optical system according to claim 9, and including a synthetic scene containing a picket fence pattern of standard radiant levels mounted adjacent said scan position, and axially offset therefrom, said array including at least one roof pair mounted with its roof edge inclined with respect to the axis of the array to optically translate the synthetic scene progressively point by point substantially to said scan position for insertion into the relay optical means.

14. An optical system according to claim 13, and including means for progressively shifting the primary image laterally of said array at a uniform rate to produce orthogonal scanning movement, said scan position being radially offset from the circle of the roof edges, and the roof edges being tilted relative to the axis of the array at respective angles that vary progressively around the array from said one roof pair to compensate for the lateral primary image movement that occurs during said optical translation of the synthetic scene.

15. An optical system according to claim 9, and including means for intercepting reflected primary image radiation corresponding to primary image areas beyond the ends of the primary image strip to be scanned, without intercepting such radiation corresponding to points of the primary image strip to be scanned.

16. An optical system according to claim 15, and in which the end points of the primary image strip to be scanned and said scan position are essentially equidistant from the array axis, and said radiation intercepting means acts essentially in the plane of symmetry of each said roof pair.

17. An optical system according to claim 2, and including means responsive to radiation passing the field stop.

18. An optical scanning system comprising a circular array of roof pairs mounted for coaxial rotation, each roof pair comprising two plane reflective surfaces which form an internal right dihedral angle at a roof edge generally parallel to the axis of the array, with the plane of symmetry of each roof pair generally radial with respect to said axis, a radiation source, optical means for imaging the source in a first image surface generally tangential with respect to the array and so positioned that the source image is translated by successive reflection in the two reflective surfaces of each roof pair of the rotating array into a moving scan image in a second image surface generally tangential with respect to the array, radiation receiving means, and second optical means for imaging the second image surface at the radiation receiving means, one of said image surfaces being elongated in a tangential direction and being substantially circularly curved with a radius of curvature approximately equal to twice the radial spacing of the roof edges from the axis of the array, the optical means for imaging the other image surface having an effective field that is limited to an elemental area which corresponds to progressively varying elemental areas of said one image surface.

19. An optical scanning system according to claim 18, and in which said first and second optical systems comprise respective centered optical systems having effective apertures that are approximately semicircular and are arranged on opposite sides of the plane of rotation of the array of roof pairs with their generally diametral aperture boundaries oppositely adjacent that plane.

20. An optical scanning system according to claim 19, and in which the optical means associated with said elongated image surface comprise a spherically concave mirror with a reflective Schmidt corrector plate and aperture stop at the center of curvature of the mirror, and the optical means associated with said other image surface comprise a generally spherical concave mirror having its center of curvature adjacent said other image surface to image the same at substantially one to one magnification.

* * * * *